(12) United States Patent
Hu et al.

(10) Patent No.: US 12,127,495 B2
(45) Date of Patent: Oct. 29, 2024

(54) TRACTOR SUSPENSION TYPE AUTOMATIC TRANSPLANTING MACHINE FOR PLUG TRAY SEEDLINGS

(71) Applicant: JIANGSU UNIVERSITY, Jiangsu (CN)

(72) Inventors: Jianping Hu, Jiangsu (CN); Rencai Yue, Jiangsu (CN); Yijun Liu, Jiangsu (CN); Zhaoxia Luo, Jiangsu (CN); Cuiping Jia, Jiangsu (CN); Zhen Wang, Jiangsu (CN); Guanlong Huang, Jiangsu (CN); Fang Qin, Jiangsu (CN); Dongdong Wu, Jiangsu (CN); Lvhua Han, Jiangsu (CN); Deyong Yang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 765 days.

(21) Appl. No.: 17/443,455

(22) Filed: Jul. 26, 2021

(65) Prior Publication Data

US 2021/0352839 A1     Nov. 18, 2021

Related U.S. Application Data

(63) Continuation of application No. PCT/CN2020/138777, filed on Dec. 24, 2020.

(30) Foreign Application Priority Data

Feb. 20, 2020     (CN) .......................... 202010106757.4

(51) Int. Cl.
*A01C 11/02*     (2006.01)
*A01G 9/08*     (2006.01)

(52) U.S. Cl.
CPC ............ *A01C 11/025* (2013.01); *A01G 9/086* (2013.01)

(58) Field of Classification Search
CPC ....... A01C 11/025; A01C 11/02; A01C 11/00; A01G 9/086; A01G 9/08; A01G 9/00
See application file for complete search history.

(56) References Cited

U.S. PATENT DOCUMENTS 4,947,579 A     8/1990     Harrison et al.

FOREIGN PATENT DOCUMENTS

| CN | 103636333 A | 3/2014 |
| CN | 104798513 A | 7/2015 |

(Continued)

*Primary Examiner* — Christopher J. Novosad
(74) *Attorney, Agent, or Firm* — AKC PATENTS, LLC; Aliki K. Collins

(57) ABSTRACT

A tractor suspension type automatic transplanting machine for plug tray seedlings includes land wheels, a machine frame, a three-point linkage, a seedling pickup mechanism, a plug tray conveying device, a plug tray recovery device, seedling separating and planting devices driven by land wheels, and a watering device. Through front and rear drive cylinders, the seedling pickup mechanism is driven to move front and back to pick up seedlings above plug trays and release seedlings above a seedling guide device. Juxtaposed left and right seedling pickup modules in the seedling pickup mechanism are driven by left and right drive cylinders, to move left and right and pick up seedlings after combing, and to release seedlings after separating towards left and right. Plug trays fall onto a plug tray conveyor belt of the plug tray recovery device and slides into a plug-tray-recovery stacking box.

5 Claims, 6 Drawing Sheets

(56) References Cited

FOREIGN PATENT DOCUMENTS

| | | | |
|---|---|---|---|
| CN | 105103741 | A | 12/2015 |
| CN | 107852919 | A | 3/2018 |
| CN | 111149488 | A | 5/2020 |
| CN | 211831845 | U | 11/2020 |

TRACTOR SUSPENSION TYPE AUTOMATIC TRANSPLANTING MACHINE FOR PLUG TRAY SEEDLINGS

CROSS REFERENCE TO RELATED CO-PENDING APPLICATIONS

This application is a continuation application of International Patent Application No. PCT/CN2020/138777, filed on Dec. 24, 2020, which claims the benefit and priority of Chinese Patent Application No. 202010106757.4 filed on February 20, entitled "TRACTOR SUSPENSION TYPE AUTOMATIC TRANSPLANTING MACHINE FOR PLUG TRAY SEEDLINGS", the disclosures of which are incorporated by reference herein in their entirety as part of the present application.

FIELD OF THE INVENTION

The present disclosure relates to the field of agricultural machineries or the field of transplanting machineries, and in particular, to a tractor suspension type automatic transplanting machine for plug tray seedlings.

BACKGROUND OF THE INVENTION

Vegetables are indispensable food in our daily life. China's planting area has reached 20 million $hm^2$, and the annual output of the vegetables has exceeded 700 million tons and grows continuously. So, China is the largest vegetable production and consumption country in the world. At present, the cultivation of agricultural vegetables in China mostly adopts a method of growing seedlings in plug trays first and then transplanting. By this method, vegetables can be prevented from the natural disasters, such as drought and freezing in a seedling growing period, and solar thermal resources can be fully utilized, which has the effects of compensating for the decrease of vegetable yield caused by climatic disasters, making crops ripen early and increasing the yield, and has huge economic and social benefits. So the research and development of a fully automatic vegetable transplanting machine suitable for China's national conditions become a precondition for realizing large-scale vegetable planting.

At present, in consideration of resource cost, modern agricultural machinery integrates as many functions as possible. In view of the situation that the cultivation area of vegetables in China is far less than that of rice and wheat at present, it is necessary to explore the potential that the efficient seeding is performed on the land for vegetable planting. Meanwhile, the cost for manually planting is over-high at present. A semi-automatic transplanter cannot meet the stability requirement of artificial all-day planting without the manual work. In addition, the semi-automatic transplanter needs to manually picks up seedlings and releases seedlings from plug trays. However, a self-propelled transplanter cannot meet the requirement on the efficiency of the large-field work, and a traction type transplanter cannot automatically realize the control for the planting depth. Therefore, a tractor suspension type automatic transplanting machine for plug tray seedlings is designed, which can realize the whole process of automatic vegetable transplanting including seedling picking-up, releasing seedlings, planting, covering soil, watering, plug tray recovering, and the like. It is important to design a transplanter that can realize convenience in mounting, various functions, and reliable structure as far as possible while ensuring good transplanting effect and transplanting efficiency.

In the prior art, a Chinese patent discloses a fully automatic transplanter. Two rows of seedlings are transplanted automatically while controlling seedling trays to overturn by using a motor. Multiple seedling trays are placed in an independent frame for seedling trays, which can be replaced independently. Seedlings are conveyed to a seedling righting mechanism through a conveyor belt, and meanwhile, the seedling trays are withdrawn to enter a storage box. And by using the traction of a tractor and an input power supply, the transplanter has the functions of planting seedlings and ridging, thus the automatic control of the whole process is realized, and the uniformity of planting distance when the traction speed changes is ensured. The transplanter places the seedlings in the seedling trays before transplanting, so the process is tedious. Accordingly, the height of the chassis of the transplanter cannot be adjusted, and the ridge width and the planting spacing in the rows cannot be adjusted, and the adaptability to the requirement on different ridge widths and the planting spacing in the rows for different crops is poor. In addition, a watering function cannot be realized, which has a certain influence on the survival rate of planted seedlings.

SUMMARY OF THE INVENTION

In view of the disadvantages in the prior art, the present disclosure provides a tractor suspension type automatic transplanting machine for plug tray seedlings. The tractor suspension realizes the lifting of a chassis bracket, which meets the requirement of different crops on planting depth, facilitates the adjustment of different planting spacing in the rows, and meets the requirement of different crops on the planting spacing in the rows. The automation of the whole process of picking-up seedlings, releasing seedlings, planting, recovering seedling trays, watering, and the like can be realized.

The present disclosure achieves the above-mentioned technical objective through the following technical means.

A tractor suspension type automatic transplanting machine for plug tray seedlings, comprising land wheels, a machine frame, a three-point linkage, a seedling pickup mechanism, a plug tray conveying device, a plug tray recovery device, seedling separating and planting devices, a watering device, and a seedling guide device.

The machine frame includes the machine frame includes a first front cross beam, a second front cross beam, a middle cross beam, a first rear cross beam, a second rear cross beam, a first left longitudinal beam, a second left longitudinal beam, a first right longitudinal beam, a second right longitudinal beam, upright posts, a plug tray conveying bracket, a plug-tray-recovery-device mounting frame, and a placement-frame cross beam of the watering device; the first front cross beam, the first rear cross beam, the first left longitudinal beam, and the first right longitudinal beam are fixed on a plane to form a bottom bracket of the machine frame; the second front cross beam, the middle cross beam, the second rear cross beam, the second left longitudinal beam, and the second right longitudinal beam are fixed to another plane to form an upper bracket of the machine frame; the bottom bracket of the machine frame is connected to the upper bracket of the machine frame through the upright posts; the plug tray conveying bracket includes a first plug-tray-conveying-device mounting longitudinal beam, a second plug-tray-conveying-device mounting longitudinal beam and linear-motion-shaft mounting bases; the first plug-tray-conveying-device mounting longitudinal beam and the second plug-tray-conveying-device mounting longitudinal beam are located between the middle cross beam and the second rear cross beam; the linear motion-shaft mounting bases are respectively fixed to the first plug-tray-conveying-device mounting longitudinal beam and the second plug-tray-conveying-device mounting longitudinal beam; the plug-tray-recovery-device mounting frame includes mounting cross beams of the plug-tray-recovery-device mounting frame, left mounting upright posts of the plug-tray-recovery-device mounting frame and right upright posts of the plug-tray-recovery-device mounting frame; ends of the mounting cross beams of the plug-tray-recovery-device mounting frame are respectively mounted on the bottom bracket of the machine frame through the left mounting upright posts of the plug-tray-recovery-device mounting frame and the right upright posts of the plug-tray-recovery-device mounting frame; the placement-frame cross beam of the watering-device is located between the first left longitudinal beam and the first right longitudinal beam.

The land wheels are mounted on a left side and a right side of both the three-point linkage and the seedling separating and planting devices through first hold-hoops; the three-point linkage is welded in a middle portion of the first front cross beam and is configured for connecting to a tractor; the seedling pickup mechanism is mounted on the upper bracket of the machine frame, and includes a seedling-pickup-mechanism bracket and a seedling pickup module; two sides of the seedling pickup module are respectively mounted on the seedling-pickup-mechanism bracket; the seedling pickup module picks up seedling pots at a seedling pickup position and conveys the seedling pots to a position above the seedling separating and planting device; the seedling guide device is fixed to the upper bracket of the machine frame, and is configured for guiding the seedling pots picked up by the seedling pickup module into the seedling separating and planting device; the plug tray conveying device is supported on the plug tray conveying bracket through the linear motion-shaft mounting bases; the plug tray conveying device is configured for conveying plug trays carried with the seedling pots to the seedling pickup position; the plug tray recovery device is mounted on the plug-tray-recovery-device mounting frame, and is located behind the plug tray conveying device; the plug tray conveying device is configured for conveying empty plug trays to the plug tray recovery device; the seedling separating and planting devices are connected to the first front cross beam; the seedling separating and planting devices are respectively mounted on a left side and a right side of the three-point linkage, and are configured for planting the seedling pots into a field ridge; the watering device includes watering-nozzle water storage mechanisms and watering nozzles; the watering-nozzle water storage mechanisms are connected to the watering nozzles through screw threads; and the watering-nozzle water storage mechanisms are connected to the placement-frame cross beam of the watering device through second hold-hoops.

Further, the plug tray recovery device includes a plug tray recovery stacking box, a sliding plate, a plug-tray-conveyor-belt mounting bracket, a plug tray baffle-plate and a conveyor belt; the plug tray recovery stacking box is fixed to the first rear cross beam; two sides of the sliding plate are connected to the plug-tray-conveyor-belt mounting bracket; the sliding plate is mounted above the plug tray recovery stacking box; the plug-tray-conveyor-belt mounting bracket is mounted on the mounting cross beam of the plug-tray-recovery-device mounting frame; the plug tray baffle-plate is hinged and fixed to a side of the plug-tray-conveyor-belt mounting bracket which is opposite to the sliding plate, and is configured for changing angles of empty plug trays that are fallen, such that the empty plug trays are in contact with the conveyor belt steadily; the conveyor belt for plug trays is mounted in a middle portion of the plug-tray-conveyor-belt mounting bracket, and is configured for conveying the empty plug trays to the plug tray recovery stacking box.

Further, the seedling pickup mechanism bracket includes a front cross beam of the seedling-pickup-mechanism bracket, a middle cross beam of the seedling-pickup-mechanism bracket, a rear cross beam of the seedling-pickup-mechanism bracket, a first left longitudinal beam of the seedling-pickup-mechanism bracket, a first right longitudinal beam of the seedling-pickup-mechanism bracket, a second left longitudinal beam of the seedling-pickup-mechanism bracket, a second right longitudinal beam of the seedling-pickup-mechanism bracket, a damper mounting cross beam, and upright posts of the seedling-pickup-mechanism bracket, the front cross beam of the seedling-pickup-mechanism bracket, the middle cross beam of the seedling-pickup-mechanism bracket, the rear cross beam of the seedling-pickup-mechanism bracket, the first left longitudinal beam of the seedling-pickup-mechanism bracket, and the second left longitudinal beam of the seedling-pickup-mechanism bracket form an seedling-pickup-bracket upper bracket; the seedling-pickup-bracket upper bracket is fixed to the upper bracket of the machine frame through the upright posts of the seedling-pickup-mechanism bracket; two ends of the damper mounting cross beam are respectively mounted on the first right longitudinal beam of the seedling-pickup-mechanism bracket and the second right longitudinal beam of the seedling-pickup-mechanism bracket; the first right longitudinal beam of the seedling-pickup-mechanism bracket is located below the first left longitudinal beam of the seedling-pickup-mechanism bracket, and two ends of the first right longitudinal beam of the seedling-pickup-mechanism bracket are connected to the upright posts of the seedling-pickup-mechanism bracket; the second right longitudinal beam of the seedling-pickup-mechanism bracket is located below the second left longitudinal beam of the seedling-pickup-mechanism bracket, and two ends of the second right longitudinal beam of the seedling-pickup-mechanism bracket are connected to the upright posts of the seedling-pickup-mechanism bracket.

Further, the left mounting upright posts of the plug-tray-recovery-device mounting frame are connected to the first left longitudinal beam through third hold-hoops; the right upright posts of the plug-tray-recovery-device mounting frame are connected to the first right longitudinal beam through fourth hold-hoops; and two ends of the placement-frame cross beam of the watering device are respectively connected to the first left longitudinal beam and the first right longitudinal beam through fifth hold-hoops.

Further, the watering device further includes a water tank; the water tank is fixedly provided between the middle cross beam of the seedling-pickup-mechanism bracket and the rear cross beam of the seedling-pickup-mechanism bracket; and the water tank supplies water to the watering-nozzle water storage mechanisms.

The present disclosure has the beneficial effects as follows.

1. The tractor suspension type automatic transplanting machine for plug tray seedlings of the present disclosure combines multiple functional modules in a frame combination manner based on the requirements of a work flow. One person can control the transplanting work of two rows and four rows of plug tray seedlings simultaneously. Multiple seedling trays carried with potted seedlings are placed in an independent placement frame of seedling trays, and the empty plug trays after picking-up and releasing seedlings are stacked in a recovery box through the plug tray recovery device.

2. The plug tray conveying device and the plug tray recovery device of the present disclosure are assembled separately. Stacking placement of the plug tray conveying device and the plug tray recovery device are realized by using a frame structure assembling in a flexible manner. A high-efficiency transplanting of continuous conveying and continuous recovering can be realized by a single person. Horizontally stacked frame structures can realize portability of a machine while reducing the height and length of the machine.

3. The planting and seedling separating power of the present disclosure is input by the land wheels. The ridge width required by different potted seedlings can be adapted due to the adoption of this frame structure. The adjustable height of the land wheels can adapt to requirements for the different planting depths. The distance between transplanters can be adjusted to adapt to requirements for different spacing in the rows.

REFERENCE SIGNS IN DRAWINGS

1—land wheel; 2—machine frame; 2-1—first front cross beam; 2-2—second front cross beam; 2-3—middle cross beam; 2-4—first rear cross beam; 2-5—second rear cross beam; 2-6—first left longitudinal beam; 2-7—second left longitudinal beam; 2-8—first right longitudinal beam; 2-9—second right longitudinal beam; 2-10—upright post; 2-11—first plug-tray-conveying-device mounting longitudinal beam; 2-12—second plug-tray-conveying-device mounting longitudinal beam; 2-13—linear motion-shaft mounting base; 2-14—mounting cross beam of a plug-tray-recovery-device mounting frame; 2-15—left mounting upright post of the plug-tray-recovery-device mounting frame; 2-16—right upright post of the plug-tray-recovery-device mounting frame; 2-17—placement-frame cross beam of a watering device; 3—three-point linkage; 4—seedling pickup mechanism; 4-1—the seedling-pickup-mechanism bracket; 4-1-1—front cross beam; 4-1-2—middle cross beam; 4-1-3—rear cross beam; 4-1-4—first left longitudinal beam; 4-1-5—first right longitudinal beam; 4-1-6—second left longitudinal beam; 4-1-7—second right longitudinal beam; 4-1-8—damper mounting cross beam; 4-1-9—upright post of the seedling-pickup-mechanism bracket; 4-2—seedling pickup module; 5—plug tray conveying device; 6—plug tray recovery device; 6-1—plug-tray-recovery stacking box; 6-2—sliding plate; 6-3—plug-tray-conveyor-belt mounting bracket; 6-4—plug tray baffle-plate; 6-5—plug tray conveyor belt; 7—seedling separating and planting device; 8—watering device; 8-1—watering-nozzle water storage mechanism; 8-2—watering nozzle; 8-3—water tank; 9—seedling guide device.

DETAILED DESCRIPTION OF THE INVENTION

The present disclosure will be further described below with reference to the accompanying drawings and specific implementations. However, the scope of protection of the present disclosure is not limited to these.

Figure 1:
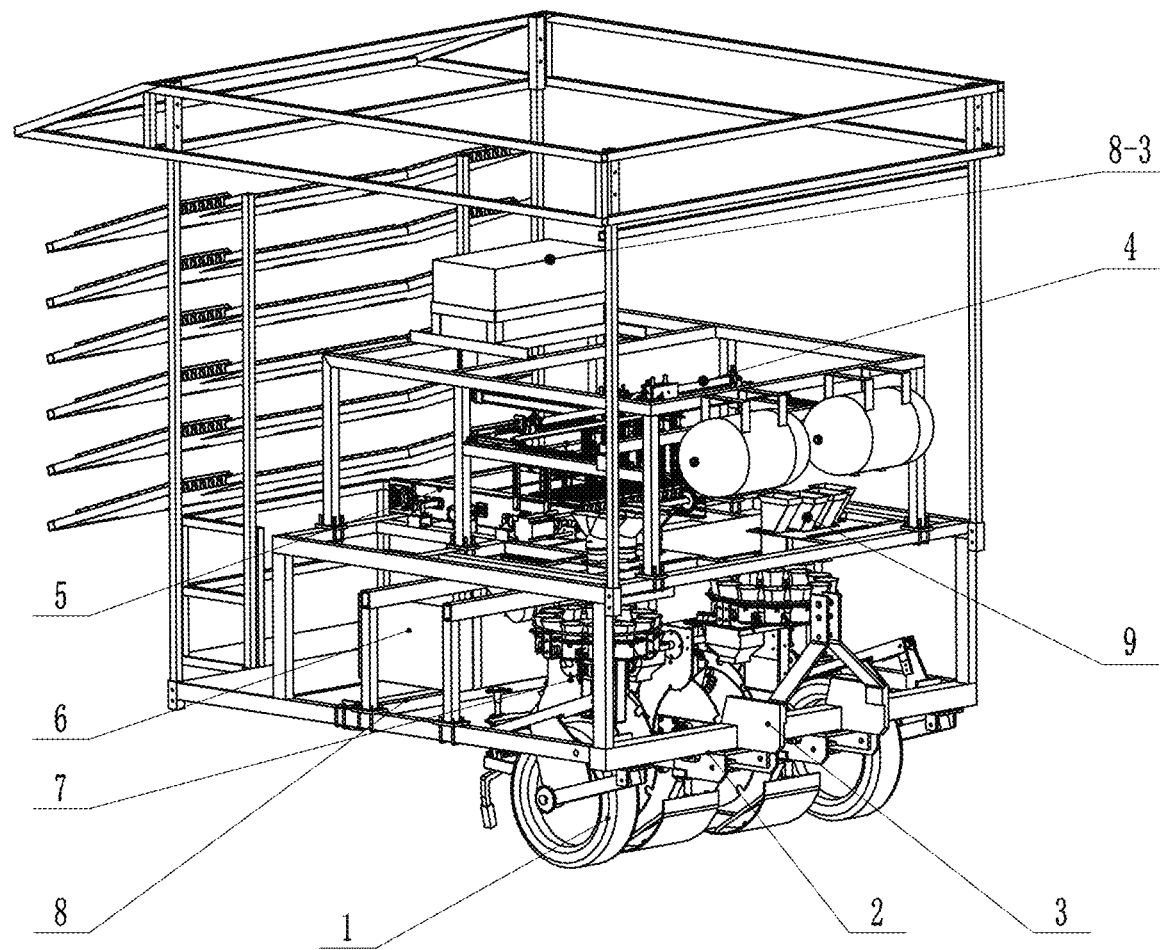
FIG. 1 is a schematic diagram of a whole structure of a tractor suspension type automatic transplanting machine for plug tray seedlings according to an embodiment of the present disclosure.
Figure 2:
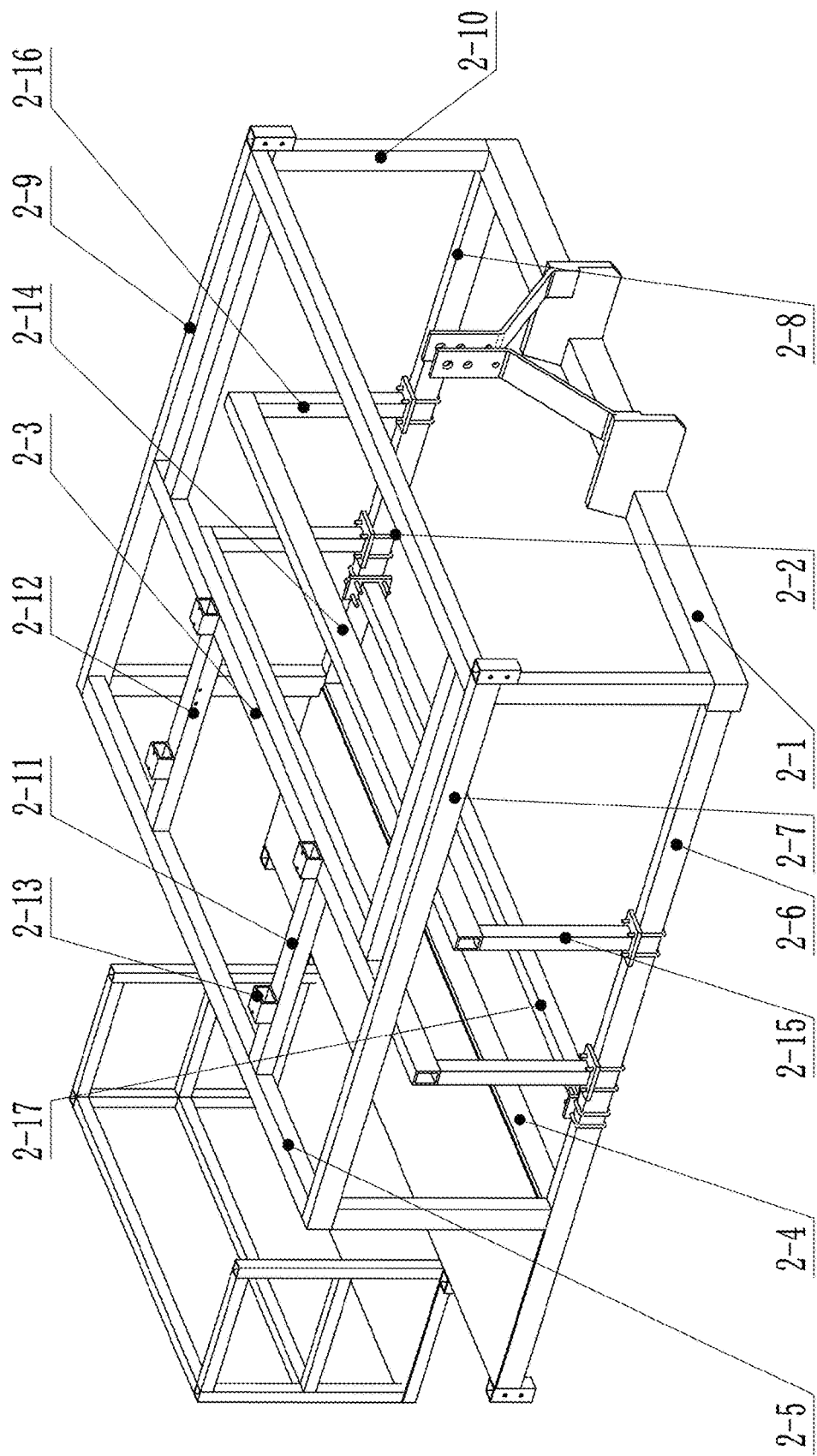
FIG. 2 is a schematic structural diagram of a machine frame according to an embodiment of the present disclosure.

As shown in FIG. 1 and FIG. 2, the tractor suspension type transplanting machine for plug tray seedlings of the present disclosure includes land wheels 1, a machine frame 2, a three-point linkage 3, a seedling pickup mechanism 4, a plug tray conveying device 5, a plug tray recovery device 6, seedling separating and planting devices 7, a watering device 8, and a seedling guide device 9.

The machine frame 2 includes a first front cross beam 2-1, a second front cross beam 2-2, a middle cross beam 2-3, a first rear cross beam 2-4, a second rear cross beam 2-5, a first left longitudinal beam 2-6, a second left longitudinal beam 2-7, a first right longitudinal beam 2-8, a second right longitudinal beam 2-9, upright posts 2-10, a plug tray conveying bracket, a mounting frame of a plug tray recovery mechanism, and a placement-frame cross beam 2-17 of the watering device. The first front cross beam 2-1, the first rear cross beam 2-4, the first left longitudinal beam 2-6, and the first right longitudinal beam 2-8 are fixed on a plane to form a bottom bracket of the machine frame together. The second front cross beam 2-2, the middle cross beam 2-3, the second rear cross beam 2-5, the second left longitudinal beam 2-7, and the second right longitudinal beam 2-9 are fixed to a plane to form an upper bracket of the machine frame together. The bottom bracket of the machine frame is connected to the upper bracket of the machine frame through the upright posts 2-10. The plug tray conveying bracket includes a first plug-tray-conveying-device mounting longitudinal beam 2-11, a second plug-tray-conveying-device mounting longitudinal beam 2-12, and linear motion-shaft mounting bases 2-13. The first plug-tray-conveying-device mounting longitudinal beam 2-11 and the second plug-tray-conveying-device mounting longitudinal beam 2-12 are located between the middle cross beam 2-3 and the second rear cross beam 2-5. The linear motion-shaft mounting bases 2-13 are respectively fixed to the first plug-tray-conveying-device mounting longitudinal beam 2-11 and the second plug-tray-conveying-device mounting longitudinal beam 2-12. The mounting frame for the plug tray recovery mechanism includes mounting cross beams 2-14 of the plug-tray-recovery-device mounting frame, left mounting upright posts 2-15 of the plug-tray-recovery-device mounting frame, and right upright posts 2-16 of the plug-tray-recovery-device mounting frame. Ends of the mounting cross beams 2-14 of the plug-tray-recovery-device mounting frame are respectively mounted on the bottom bracket of the machine frame through the left mounting upright posts 2-15 of the plug-tray-recovery device mounting frame and the right upright posts 2-16 of the plug-tray-recovery-device mounting frame. The placement-frame cross beam 2-17 of the watering device is located between the first left longitudinal beam 2-6 and the first right longitudinal beam 2-8.

The land wheels 1 are mounted on a left side and a right side of both the three-point linkage 3 and the seedling separating and planting devices 7 through hold-hoops. The three-point linkage 3 is welded in the middle of the first front cross beam 2-1 and is configured for connecting a tractor. The whole transplanter is lifted by suspending a lifting device on the tractor.

Figure 3:
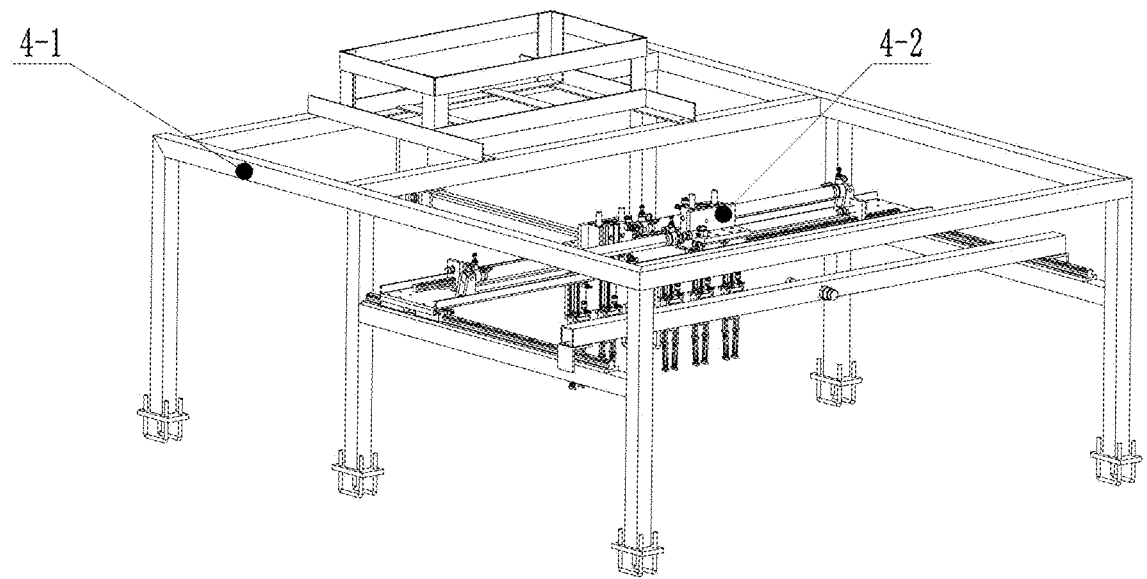
FIG. 3 is a schematic diagram of a seedling pickup mechanism according to an embodiment of the present disclosure.
Figure 4:
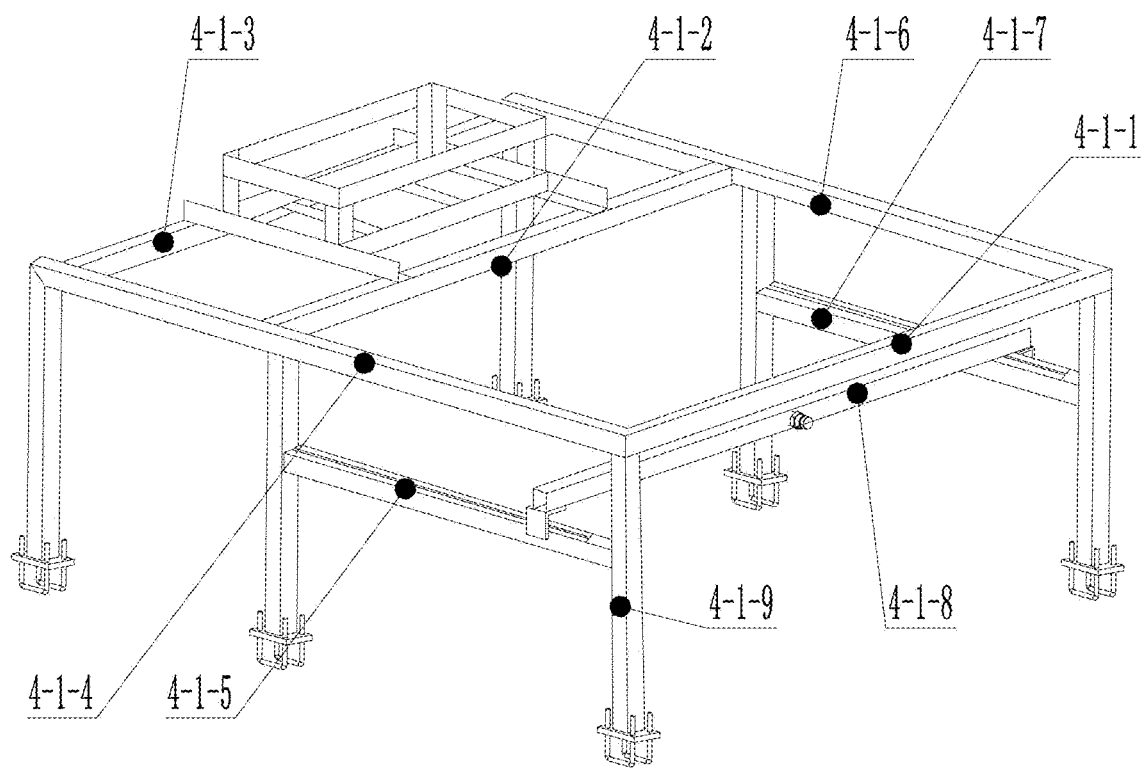
FIG. 4 is a schematic structural diagram of a seedling pickup frame according to an embodiment of the present disclosure.

As shown in FIG. 2, FIG. 3, and FIG. 4, the seedling pickup mechanism 4 is mounted on the upper bracket of the machine frame, and includes a seedling-pickup-mechanism bracket 4-1 and a seedling pickup module 4-2. Two sides of the seedling pickup module 4-2 are respectively mounted on the seedling-pickup-mechanism bracket 4-1. The seedling pickup module 4-2 picks up seedling pots at a seedling pickup position and conveys the seedling pots to a position above the seedling separating and planting device 7. The seedling-pickup-mechanism bracket 4-1 includes a front cross beam 4-1-1, a middle cross beam 4-1-2, a rear cross beam 4-1-3, a first left longitudinal beam 4-1-4, a first right longitudinal beam 4-1-5, a second left longitudinal beam 4-1-6, a second right longitudinal beam 4-1-7, a mounting cross beam 4-1-8 of a damper, and upright posts 4-1-9 of the seedling-pickup-mechanism bracket. The front cross beam 4-1-1, the middle cross beam 4-1-2, the rear cross beam 4-1-3, the first left longitudinal beam 4-1-4, and the second left longitudinal beam 4-1-6 form an upper bracket of the seedling pickup bracket. The upper bracket of the seedling pickup bracket is fixed to the upper bracket of the machine frame through the upright posts 4-1-9 of the seedling-pickup-mechanism bracket. Two ends of the mounting cross beam 4-1-8 of the damper are respectively mounted on the first right longitudinal beam 4-1-5 and the second right longitudinal beam 4-1-7. The first right longitudinal beam 4-1-5 is located below the first left longitudinal beam 4-1-4, and the two ends of the first right longitudinal beam 4-1-5 are connected to the upright posts 4-1-9 of the seedling-pickup-mechanism bracket. The second right longitudinal beam 4-1-7 is located below the second left longitudinal beam 4-1-6, and two ends of the second right longitudinal beam 4-1-7 are connected to the upright posts 4-1-9 of the seedling-pickup-mechanism bracket.

Figure 5:
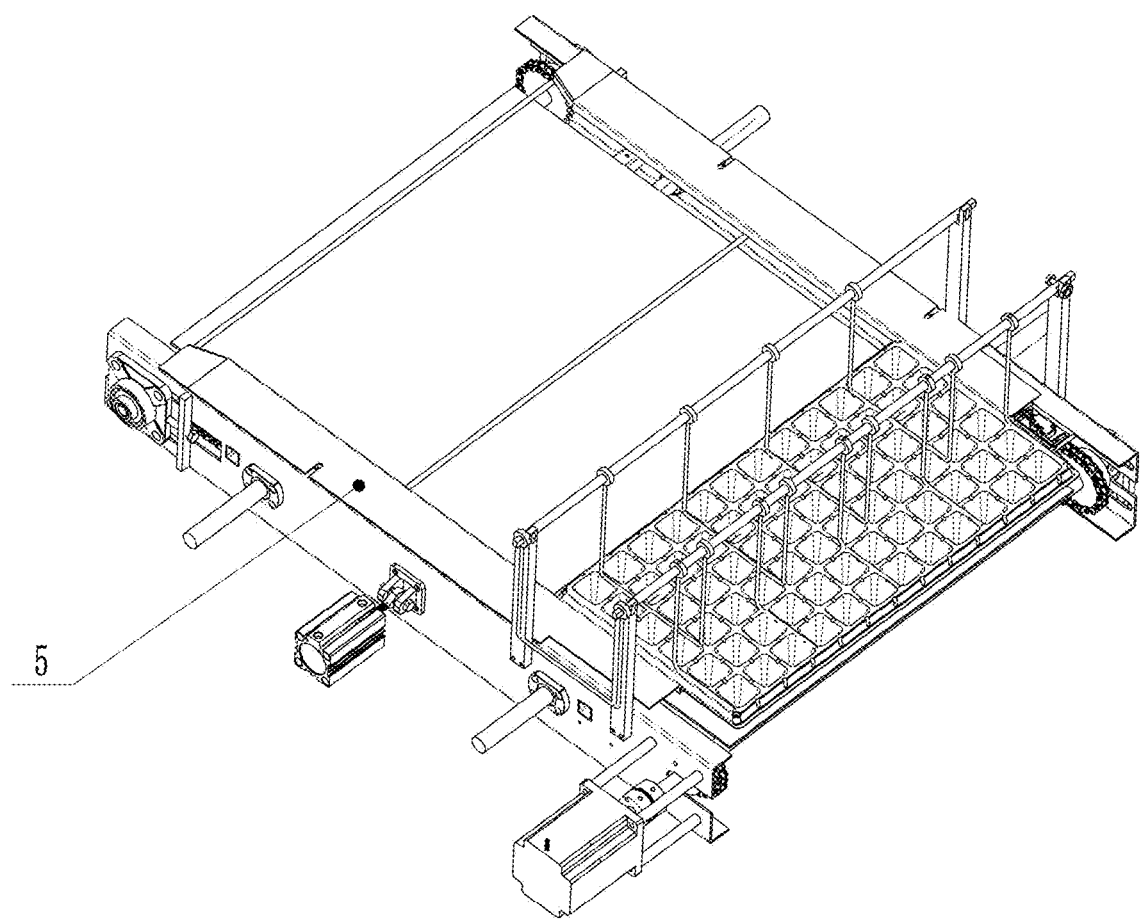
FIG. 5 is a schematic diagram of a plug tray conveying device according to an embodiment of the present disclosure.
Figure 9:
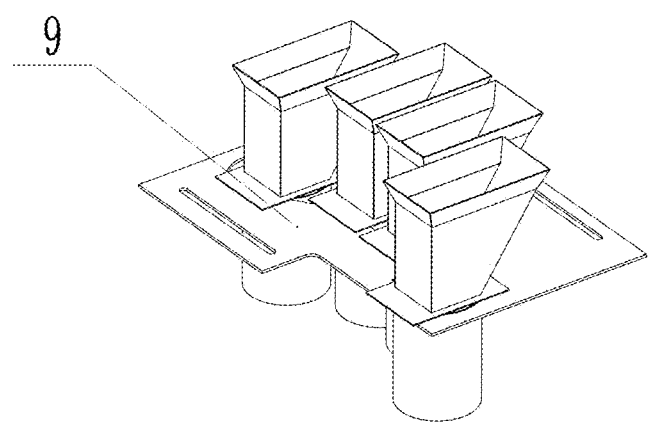
FIG. 9 is a schematic diagram of a seedling guide device according to an embodiment of the present disclosure.

As shown in FIG. 9, the seedling guide device 9 is fixed to the upper bracket of the machine frame, and is configured for guiding the seedling pots that are picked-up by the seedling pickup module 4-2 into the seedling separating and planting device 7. As shown in FIG. 5, the plug tray conveying device 5 is supported on the plug tray conveying bracket through the linear motion-shaft mounting bases 2-13. The plug tray conveying device 5 is configured for conveying plug trays carried with seedling pots to the seedling pickup position, and then the seedling pots are conveyed above the seedling guide device 9 for releasing through the seedling pickup module 4-2.

Figure 6:
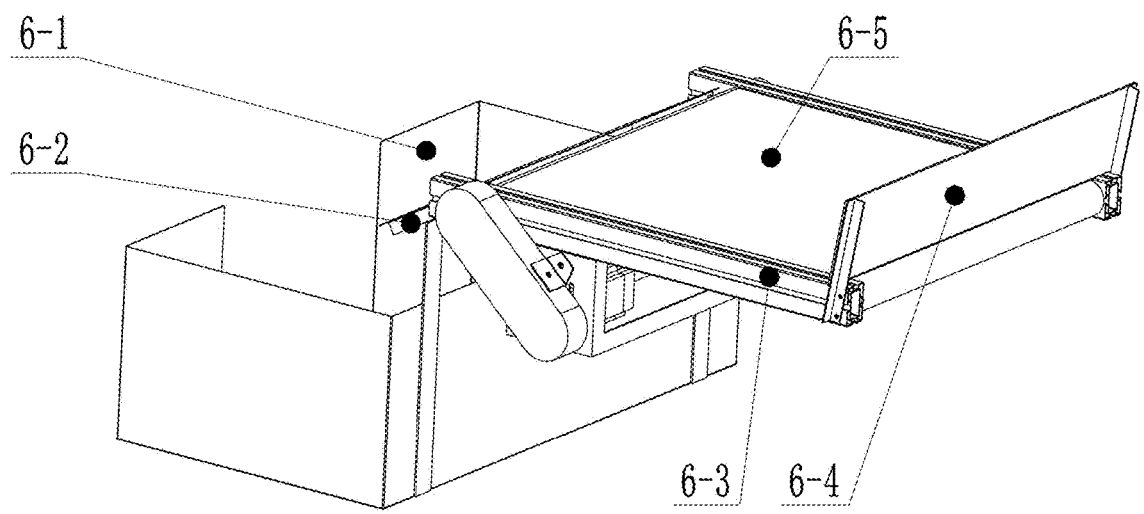
FIG. 6 is a schematic diagram of a plug tray recovery device according to an embodiment of the present disclosure.

As shown in FIG. 6, the plug tray recovery device 6 is mounted on the mounting frame for the plug tray recovery mechanism and is located behind the plug tray conveying device 5. The plug tray conveying device 5 is configured for conveying empty plug trays to the plug tray recovery device 6. The plug tray recovery device 6 includes a plug-tray-recovery stacking box 6-1, a sliding plate 6-2, a plug-tray-conveyor-belt mounting bracket 6-3, a plug tray baffle-plate 6-4, and a conveyor belt 6-5. The stacking box of recovering plug trays 6-1 is fixed to the first rear cross beam 2-4. The left side and the right side of the sliding plate 6-2 are bent into be L-shaped. The sliding plate 6-2 is hinged and fixed to the plug-tray-conveyor-belt mounting bracket 6-3 on the two sides of the plug tray conveyor belt. The sliding plate 6-2 is mounted above the plug-tray-recovery stacking box 6-1. The plug-tray-conveyor-belt mounting bracket 6-3 is mounted on the mounting cross beam 2-14 of the plug-tray-recovery-device mounting frame. The plug tray baffle-plate 6-4 is hinged and fixed to a side of the plug-tray-conveyor-belt mounting bracket 6-3 which is opposite to the sliding plate, and is configured for changing the angles of empty plug trays that are fallen, so that the empty plug trays are in contact with the conveyor belt 6-5 steadily. The conveyor belt 6-5 for plug trays is mounted in the middle of the plug-tray-conveyor-belt mounting bracket 6-3, and is configured for conveying the empty plug trays to the plug-tray-recovery stacking box 6-1.

Figure 7:
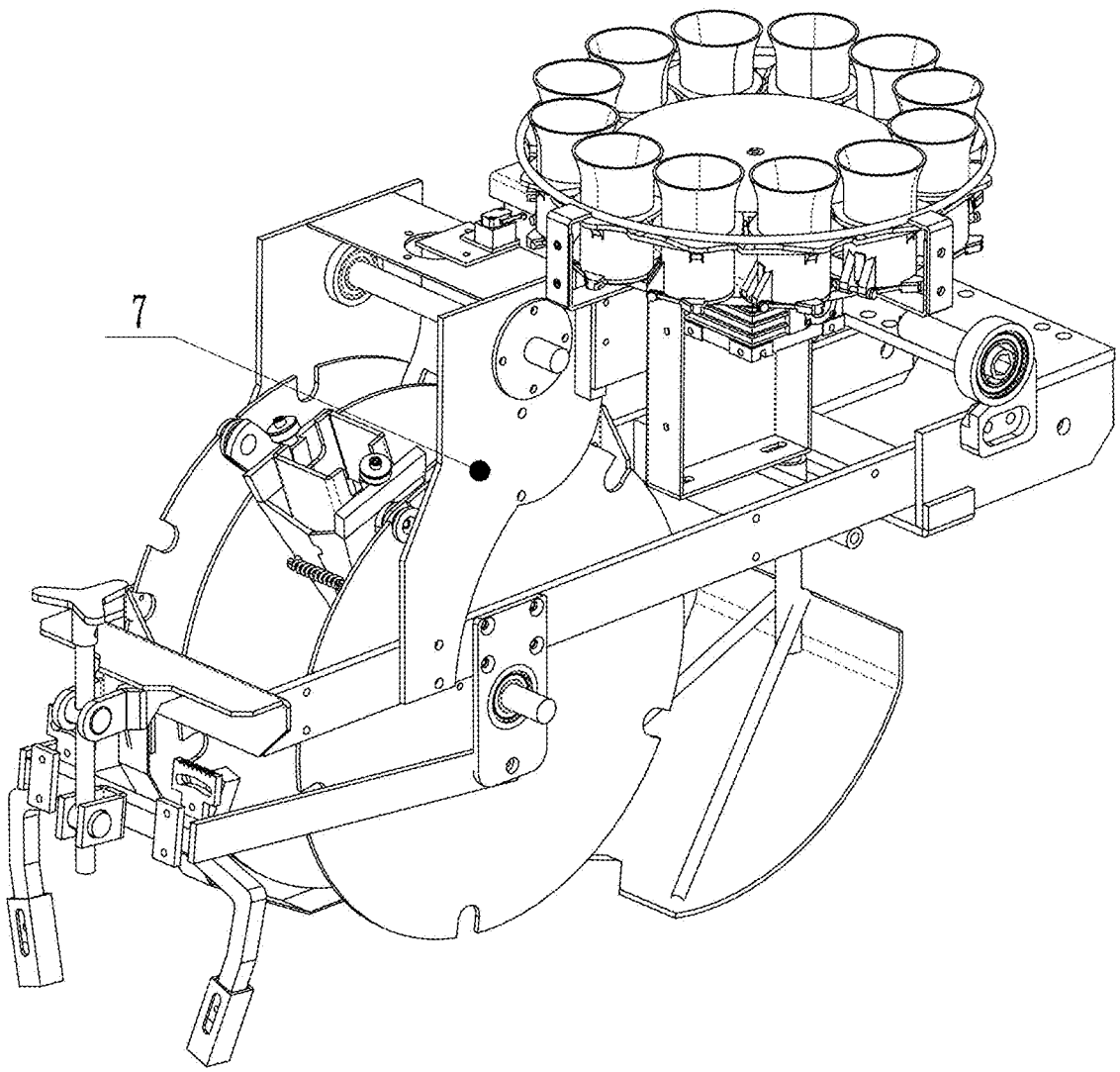
FIG. 7 is a schematic diagram of a seedling separating and transplanting device according to an embodiment of the present disclosure.
Figure 8:
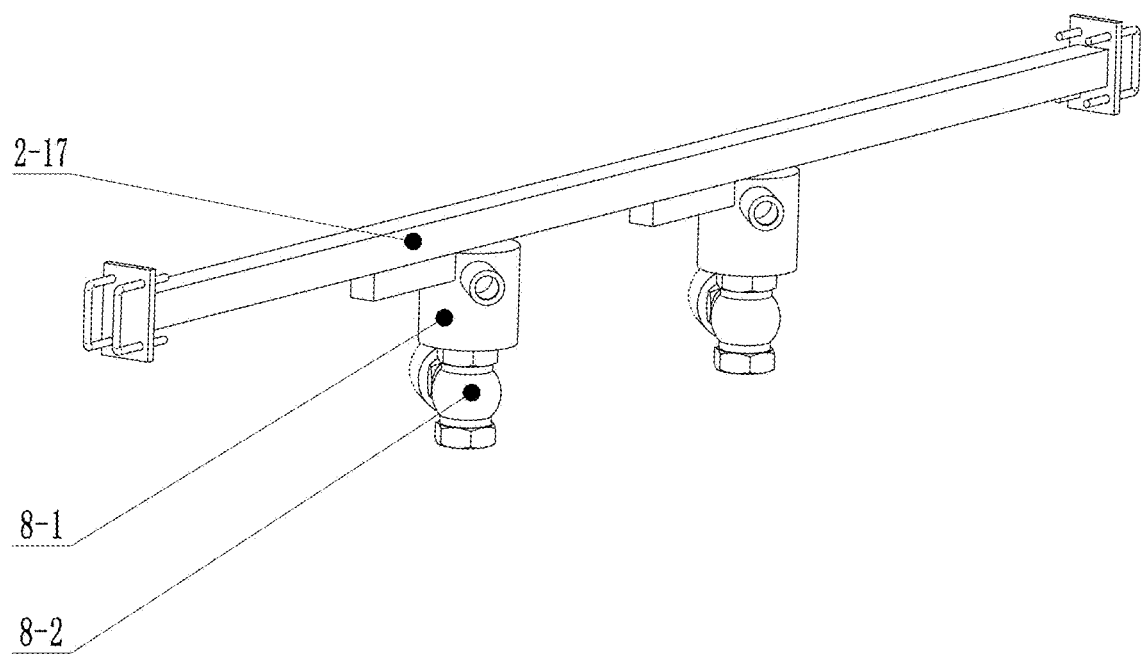
FIG. 8 is a schematic diagram of a watering device according to an embodiment of the present disclosure.

As shown in FIG. 7, the seedling separating and planting devices 7 are connected to the first front cross beam 2-1. The seedling separating and planting devices 7 are respectively mounted on the left side and the right side of the three-point linkage 3, and are configured for planting the seedling pots into a field ridge. As shown in FIG. 8, the watering device 8 includes watering-nozzle water storage mechanisms 8-1 and watering nozzles 8-2. The watering-nozzle water storage mechanisms 8-1 are connected to the watering nozzles 8-2 through screw threads. The watering-nozzle water storage mechanisms 8-1 are connected to the placement-frame cross beam 2-17 through hold-hoops.

The watering device 8 further includes a water tank 8-3. The water tank 8-3 is fixedly placed above the middle cross beam 4-1-2 and the rear cross beam 4-1-3. A water source carried by the water tank supplies water to the watering-nozzle water storage mechanisms 8-1. The infusion of the water source is realized by the self-weight of the water source carried in the water tank 8-3. The watering nozzles 8-2 work after the seedling pots are planted by the transplanters, so as to complete watering at fixed points.

The left mounting upright posts 2-15 of the plug-tray-recovery-device mounting frame are connected to the first left longitudinal beam 2-6 through hold-hoops. The right upright posts 2-16 of the plug-tray-recovery-device mounting frame are connected to the first right longitudinal beam 2-8 through the hold-hoops. Two ends of the placement-frame cross beam 2-17 of the watering device are respectively connected to the first left longitudinal beam 2-6 and the first right longitudinal beam 2-8 through hold-hoops.

The embodiment is a preferred implementation manner of the present disclosure. However, the present disclosure is not limited to the above-mentioned implementation manner. Any obvious modifications, substitutions or variations made by those of skill in the art fall within the scope of protection of the present disclosure without departing from the substance of the present disclosure.

Several embodiments of the present invention have been described. Nevertheless, it will be understood that various modifications may be made without departing from the spirit and scope of the invention. Accordingly, other embodiments are within the scope of the following claims.

What is claimed is:

1. A tractor suspension automatic transplanting machine for plug tray seedlings, comprising land wheels, a machine frame, a three-point linkage, a seedling pickup mechanism, a plug tray conveying device, a plug tray recovery device, seedling separating and planting devices, a watering device, and a seedling guide device, wherein the machine frame comprises a first front cross beam, a second front cross beam, a middle cross beam, a first rear cross beam, a second rear cross beam, a first left longitudinal beam, a second left longitudinal beam, a first right longitudinal beam, a second right longitudinal beam, upright posts, a plug tray conveying bracket, a plug-tray-recovery-device mounting frame, and a placement-frame cross beam of the watering device; the first front cross beam, the first rear cross beam, the first left longitudinal beam, and the first right longitudinal beam are fixed on a plane to form a bottom bracket of the machine frame; the second front cross beam, the middle cross beam, the second rear cross beam, the second left longitudinal beam, and the second right longitudinal beam are fixed to another plane to form an upper bracket of the machine frame; the bottom bracket of the machine frame is connected to the upper bracket of the machine frame through the upright posts; the plug tray conveying bracket comprises a first plug-tray-conveying-device mounting longitudinal beam, a second plug-tray-conveying-device mounting longitudinal beam and linear-motion-shaft mounting bases; the first plug-tray-conveying-device mounting longitudinal beam and the second plug-tray-conveying-device mounting longitudinal beam are located between the middle cross beam and the second rear cross beam; the linear motion-shaft mounting bases are respectively fixed to the first plug-tray-conveying-device mounting longitudinal beam and the second plug-tray-conveying-device mounting longitudinal beam; the plug-tray-recovery-device mounting frame comprises mounting cross beams of the plug-tray-recovery-device mounting frame, left mounting upright posts of the plug-tray-recovery-device mounting frame and right upright posts of the plug-tray-recovery-device mounting frame; ends of the mounting cross beams of the plug-tray-recovery-device mounting frame are respectively mounted on the bottom bracket of the machine frame through the left mounting upright posts of the plug-tray-recovery-device mounting frame and the right upright posts of the plug-tray-recovery-device mounting frame; the placement-frame cross beam of the watering-device is located between the first left longitudinal beam and the first right longitudinal beam;

the land wheels are mounted on a left side and a right side of both the three-point linkage and the seedling separating and planting devices through first hold-hoops; the three-point linkage is welded in a middle portion of the first front cross beam and is configured for connecting to a tractor; the seedling pickup mechanism is mounted on the upper bracket of the machine frame, and comprises a seedling-pickup-mechanism bracket and a seedling pickup module; two sides of the seedling pickup module are respectively mounted on the seedling-pickup-mechanism bracket; the seedling pickup module picks up seedling pots at a seedling pickup position and conveys the seedling pots to a position above the seedling separating and planting device; the seedling guide device is fixed to the upper bracket of the machine frame, and is configured for guiding the seedling pots picked up by the seedling pickup module into the seedling separating and planting device; the plug tray conveying device is supported on the plug tray conveying bracket through the linear motion-shaft mounting bases; the plug tray conveying device is configured for conveying plug trays carried with the seedling pots to the seedling pickup position; the plug tray recovery device is mounted on the plug-tray-recovery-device mounting frame, and is located behind the plug tray conveying device; the plug tray conveying device is configured for conveying empty plug trays to the plug tray recovery device; the seedling separating and planting devices are connected to the first front cross beam; the seedling separating and planting devices are respectively mounted on a left side and a right side of the three-point linkage, and are configured for planting the seedling pots into a field ridge; the watering device comprises watering-nozzle water storage mechanisms and watering nozzles; the watering-nozzle water storage mechanisms are connected to the watering nozzles through screw threads; and the watering-nozzle water storage mechanisms are connected to the placement-frame cross beam of the watering device through second hold-hoops.

2. The tractor suspension automatic transplanting machine for plug tray seedlings according to claim 1, wherein the plug tray recovery device comprises a plug tray recovery stacking box, a sliding plate, a plug-tray-conveyor-belt mounting bracket, a plug tray baffle-plate and a conveyor belt; the plug tray recovery stacking box is fixed to the first rear cross beam; two sides of the sliding plate are connected to the plug-tray-conveyor-belt mounting bracket; the sliding plate is mounted above the plug tray recovery stacking box; the plug-tray-conveyor-belt mounting bracket is mounted on the mounting cross beam of the plug-tray-recovery-device mounting frame; the plug tray baffle-plate is hinged and fixed to a side of the plug-tray-conveyor-belt mounting bracket which is opposite to the sliding plate, and is configured for changing angles of empty plug trays that are fallen, such that the empty plug trays are in contact with the conveyor belt steadily; the conveyor belt for plug trays is mounted in a middle portion of the plug-tray-conveyor-belt mounting bracket, and is configured for conveying the empty plug trays to the plug tray recovery stacking box.

3. The tractor suspension automatic transplanting machine for plug tray seedlings according to claim 1, wherein a seedling-pickup-mechanism bracket comprises a front cross beam of the seedling-pickup-mechanism bracket, a middle cross beam of the seedling-pickup-mechanism bracket, a rear cross beam of the seedling-pickup-mechanism bracket, a first left longitudinal beam of the seedling-pickup-mechanism bracket, a first right longitudinal beam of the seedling-pickup-mechanism bracket, a second left longitudinal beam of the seedling-pickup-mechanism bracket, a second right longitudinal beam of the seedling-pickup-mechanism bracket, a damper mounting cross beam, and upright posts of the seeding-pickup-mechanism bracket, the front cross beam of the seedling-pickup-mechanism bracket, the middle cross beam of the seedling-pickup-mechanism bracket, the rear cross beam of the seedling-pickup-mechanism bracket, the first left longitudinal beam of the seedling-pickup-mechanism bracket, and the second left longitudinal beam of the seedling-pickup-mechanism bracket form an seedling-pickup-bracket upper bracket; the seedling-pickupbracket upper bracket is fixed to the upper bracket of the machine frame through the upright posts of the seedling-pickup-mechanism bracket; two ends of the damper mounting cross beam are respectively mounted on the first right longitudinal beam of the seedling-pickup-mechanism bracket and the second right longitudinal beam of the seedling-pickup-mechanism bracket; the first right longitudinal beam of the seedling-pickup-mechanism bracket is located below the first left longitudinal beam of the seedling-pickup-mechanism bracket, and two ends of the first right longitudinal beam of the seedling-pickup-mechanism bracket are connected to the upright posts of the seedling-pickup-mechanism bracket; the second right longitudinal beam of the seedling-pickup-mechanism bracket is located below the second left longitudinal beam of the seedling-pickup-mechanism bracket, and two ends of the second right longitudinal beam of the seedling-pickup-mechanism bracket are connected to the upright posts of the seedling-pickup-mechanism bracket.

4. The tractor suspension automatic transplanting machine for plug tray seedlings according to claim 3, wherein the watering device further comprises a water tank; the water tank is fixedly provided between the middle cross beam of the seedling-pickup-mechanism bracket and the rear cross beam of the seedling-pickup-mechanism bracket; and the water tank supplies water to the watering-nozzle water storage mechanisms.

5. The tractor suspension automatic transplanting machine for plug tray seedlings according to claim 1, wherein the left mounting upright posts of the plug-tray-recovery-device mounting frame are connected to the first left longitudinal beam through third hold-hoops; the right upright posts of the plug-tray-recovery-device mounting frame are connected to the first right longitudinal beam through fourth hold-hoops; and two ends of the placement-frame cross beam of the watering device are respectively connected to the first left longitudinal beam and the first right longitudinal beam through fifth hold-hoops.

* * * * *